US011400554B1

(12) United States Patent
Harrison et al.

(10) Patent No.: US 11,400,554 B1
(45) Date of Patent: Aug. 2, 2022

(54) DECKING STOP DEVICE

(71) Applicant: Amazon Technologies, Inc., Seattle, WA (US)

(72) Inventors: Samuel F. Harrison, Lynnwood, WA (US); Tiffany Lynn Cremer, Seattle, WA (US); Kevin Mei, Garfield, NJ (US); Andrew John Gawne, Renton, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 417 days.

(21) Appl. No.: 16/710,914

(22) Filed: Dec. 11, 2019

(51) Int. Cl.
*H01T 23/00* (2006.01)
*B23Q 3/15* (2006.01)

(52) U.S. Cl.
CPC ..................................... *B23Q 3/15* (2013.01)

(58) Field of Classification Search
None
See application file for complete search history.

(56) References Cited

U.S. PATENT DOCUMENTS

| | | | | |
|---|---|---|---|---|
| 5,609,451 | A | * | 3/1997 | McCorkle, Jr. ............ B60P 7/13 410/76 |
| 10,995,808 | B1 | * | 5/2021 | Larson ................. B65G 13/075 |
| 11,142,319 | B1 | * | 10/2021 | Harrison ................ B64D 9/003 |
| 2003/0161700 | A1 | * | 8/2003 | Moore ....................... B60P 7/15 410/102 |
| 2016/0061285 | A1 | * | 3/2016 | Green ................ B65D 19/0028 267/141 |

* cited by examiner

*Primary Examiner* — Stephen W Jackson
(74) *Attorney, Agent, or Firm* — Thomas | Horstemeyer, LLP.

(57) ABSTRACT

A stop device for holding a unit load device in place on decking is described. In one example, the stop device includes a switchable magnet with an actuator to engage or disengage the stop device on decking using a switchable magnetic field of the stop device. The stop device also includes an interface bumper secured over a first surface of the switchable magnet, a foot plate secured over a second surface of the switchable magnet, and a handle rod assembly that extends from the switchable magnet for positioning the switchable magnet on the decking. The handle rod assembly includes a switch linkage, with the switch linkage extending from the actuator of the switchable magnet to a distal end of the handle rod assembly with a handle for a user. An individual can rotate a locking lever of the stop device to engage or disengage the stop device on the decking.

20 Claims, 15 Drawing Sheets

DECKING STOP DEVICE

BACKGROUND

The term unit load device (ULD) can refer to a number of different types or styles of containers, pallets, cans, pods, or other means of supporting and containing freight. ULDs are commonly used to load various types of freight, of any type, onto aircraft, but ULDs are also used to move items in warehouses and for other related purposes. ULDs can be relied upon to support and contain a significant amount of goods into a single unit. ULDs are easier to move than individual boxes, for example, and save time in loading and unloading. Each ULD can have its own packing list, and the contents of each ULD can be tracked more easily than individual boxes.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

DETAILED DESCRIPTION

Figure 1:
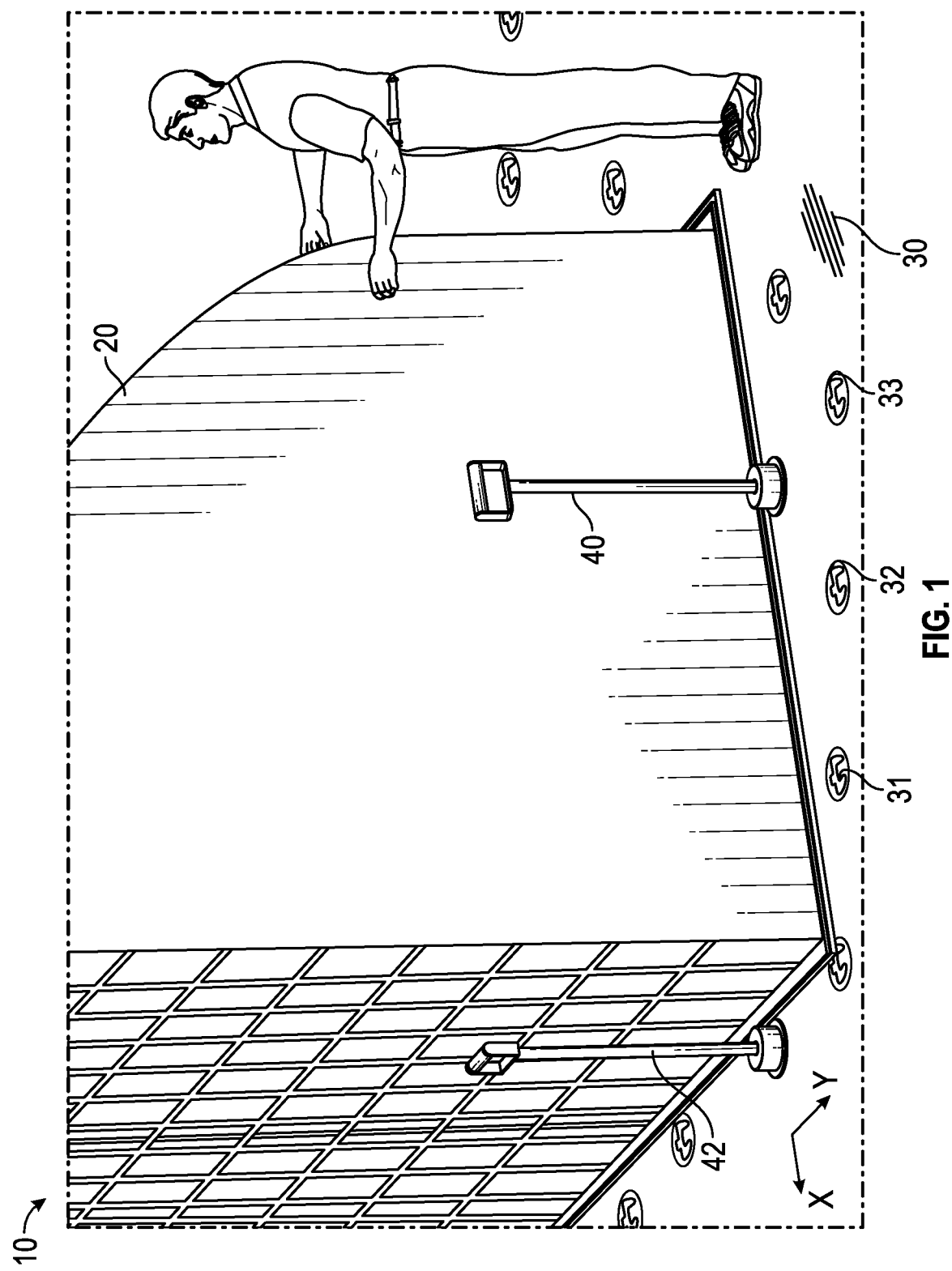
FIG. 1 illustrates a materials handling facility in which a number of stop devices are used to hold a unit load device (ULD) in position on decking according to various aspects of the embodiments of the present disclosure.

As noted above, unit load devices (ULDs) are commonly used to transport and load items, such as packages, luggage, and other freight. ULDs can be used to load items onto aircraft, but ULDs can also be used to move items between different locations in warehouses and materials handling facilities. ULDs are easier to move than individual boxes, for example, and save time in loading and unloading. Each ULD can have its own packing list, and the contents of each ULD can be tracked more easily than individual boxes.

Materials handling facilities can rely on rack systems, mezzanines, conveyor systems, decking systems, and other types of equipment and fixtures for the storage and transportation of items in the facilities. A number of variations of those fixtures are commercially available to fit a number of different needs in materials handling facilities. For example, a number of different types of decking systems are available, including roller decking, ball decking, caster decking, and other types of decking. Decking systems are particularly helpful for moving relatively large and heavy items, objects, pallets, ULDs, and other containers among different locations in materials handling facilities. Individuals wearing flexible-soled shoes can typically walk and maintain traction on decking. At the same time, the individuals can push or pull the heavy items or containers over the decking. The heavy items or containers will roll upon the rollers, balls, casters, or other moving parts built into the decking, to permit the items or containers to be easily moved over the decking.

It can be useful, in many cases, to maintain containers or ULDs at certain positions over decking for loading, unloading, and other purposes. It can also be a safety concern to permit ULDs to roll freely on decking without any means to restrain the movement of the ULDs. Decking can include means to restrain the movement of ULDs, such as pop-up locks incorporated into the decking. However, certain types of decking do not include pop-up locks, and an alternative means to restrain the movement of ULDs and other containers is needed for those types of decking.

In the context described above, a number of different stop devices for holding ULDs or other containers in place (or interfering with the movement of the ULDs in certain directions) on decking is described. The stop devices described herein can be secured at certain locations on decking. The stop devices are designed to hold onto or engage with the decking, to provide a type of bumper or other mechanical interference against the movement of ULDs on the decking. The stop devices provide a safety mechanism against the free movement of ULDs on decking systems.

In one example, a stop device includes a cylindrical socket having an outer surface, an inner surface, an open end, and a closed end. The stop device also includes a circular brim extending out from the outer surface, substantially perpendicular to the outer surface of the cylindrical socket, and a handle rod assembly that extends from the closed end of the cylindrical socket. The handle rod assembly can be used to lower the cylindrical socket into an aperture in the decking, such as aperture for a caster wheel in the decking. The handle rod assembly can also be used to rotate the stop device, aligning a circular segment cutout of the circular brim with an edge of a ULD, to lock the stop device in place below the edge of the ULD.

In another example, the stop device includes a switchable magnet, an interface bumper secured over a side surface of the switchable magnet, and a handle rod assembly that extends from the switchable magnet for positioning the switchable magnet on the decking. The switchable magnet provides a magnetic field for adhering the stop device to the decking in one state. In another state, the switchable magnet impedes the magnetic field for releasing the stop device from the decking. The interface bumper can include an angled surface to deflect force from an edge of the ULD toward a surface of the decking, and the stop device can also include a friction pad over a bottom surface of the switchable magnet to prevent the stop device from slipping on the surface of the decking. These and other aspects of the embodiments are described below.

Turning to the drawings, FIG. 1 illustrates a materials handling facility 10 in which stop devices 40 and 42 are used to hold a ULD 20 in position on decking 30. As shown in FIG. 1, the decking 30 includes a number of rollers 31-33. The decking 30 can be embodied as roller decking, caster decking, ball decking, or another type of decking. Apart from the rollers 31-33, the top surface of the decking 30 can be formed from diamond plate steel, for example, or a similar surface suitable for individuals with soft-soled shoes to walk upon. The ULD 20 does not rest directly upon the top surface of the decking 30 but rather upon the rollers 31-33, which extend above the top surface of the decking 30. The rollers 31-33 can extend about an inch above the top surface of the decking 30 in one example, but other spacings can be relied upon. Each of the rollers 31-33 is supported below the top surface of the decking 30 (see FIG. 2A) and is exposed, in part, through a respective opening or aperture in the top surface of the decking 30. A circular clearance aperture exists around each of the rollers 31-33. The circular clearance apertures permit the rollers 31-33 to rotate around without mechanical interference with the top surface of the decking 30.

The rollers 31-33, among others in the decking 30, provide a surface upon which the ULD 20 can roll. Thus, the ULD 20 can be pushed over the ball decking 30 relatively easily by individuals standing on the decking 30. The ULD 20 can be easily moved and rotated in any direction on the decking 30 based on the forces applied to the exterior surfaces of the ULD 20. The ULD 20 can rest on the rollers 31-33 of the decking 30 at a height of about 1 inch above the surface of the decking 30. The decking 30 does not include any particular means for holding the ULD 20 in place. For example, the decking 30 does not include pop-up locks or any other mechanism to prevent movement of the ULD 20. Instead, the stop devices 40 and 42 are used to interfere with the movement of the ULD 20 as described herein. Any number of stop devices can be used around various sides of the ULD 20, as needed.

In the embodiment shown in FIG. 1, the stop device 40 is relied upon to prevent the ULD 20 from moving in the direction "Y," and the stop device 41 is relied upon to prevent the ULD 20 from moving in the direction "X". Any number of additional stop devices, similar to the stop devices 40 and 42, can be used around the periphery of the ULD 20 to prevent movement of the ULD 20. Thus, the stop devices 40 and 42 can be relied upon to maintain the ULD 20 in a certain position on the decking 30 and to prevent the ULD 20 from rolling in certain directions. The stop devices 40 and 42 provide a useful tool in the materials handling facility 10. A number of stop devices similar to the stop devices 40 and 42 are described below.

Figure 2A:
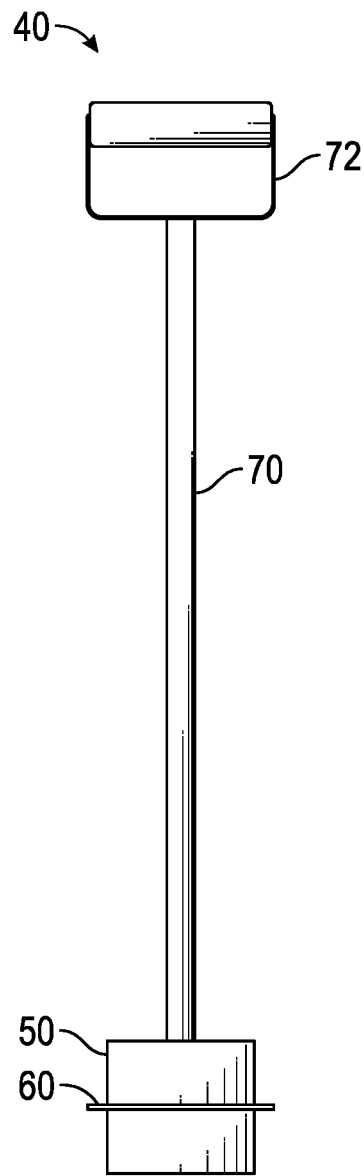
FIG. 2A illustrates an example stop device according to various aspects of the embodiments of the present disclosure.

FIG. 2A illustrates an example of the stop device 40 shown in FIG. 1 according to various aspects of the embodiments of the present disclosure. The stop device 40 is not drawn to scale or exact proportions in FIG. 1 but is provided as a representative example to convey the concepts of a stop device according to the embodiments. The stop device 40 includes a socket 50 comprising an open end and a closed end, as described in further detail below, a brim 60 extending out from an outer surface of the socket 50, and a handle rod assembly that extends from the closed end of the socket 50. The interior of the socket 50 is open or hollow, and the socket 50 can be lowered into a clearance aperture around one of the rollers 31-33, among others, in the decking 30.

The handle rod assembly includes a rod 70 secured to the closed end of the socket 50 at one end of the rod 70, and a handle 72 secured to the rod 70 at another end of the rod 70. The handle rod assembly can be used to lower the socket 50 into clearance apertures in the decking 30, as described in further detail below with reference to FIG. 2B.

The stop device 40 can be formed from any suitable materials in any suitable way. Because the socket 50 of the stop device 40 is relied upon to provide a type of bumper against an edge of the ULD 20, the socket 50 can preferably be formed from a strong, rigid material, such as metal. The remaining components of the stop device 40 can also be formed from metal, including aluminum or steel, for example. In other cases, however, one or more components of the stop device 40 can be formed from other materials, including plastics, wood, rubber, and other materials. The stop device 40 can be formed using any suitable manufacturing process. In one example, the stop device 40 can be assembled from separate components and welded or secured together using mechanical fasteners at certain points. The overall dimensions of the stop device 40 can vary based on number of factors. The particular size of the socket 50, in particular, can vary based on the type of decking with which the stop device 40 is used as described below. Similarly, the length of the rod 70 can vary based on ergonomic factors, such as the average height of the individuals using the stop device 40.

Figure 2B:
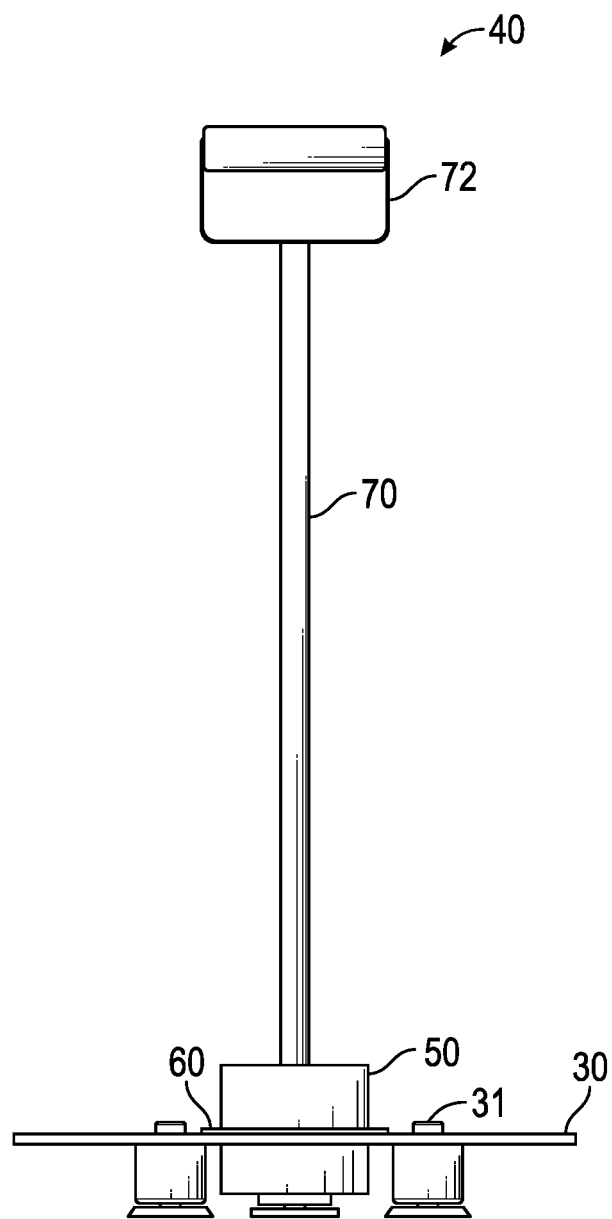
FIG. 2B illustrates the example stop device shown in FIG. 2A, inserted into a clearance aperture in decking according to various aspects of the embodiments of the present disclosure.

FIG. 2B illustrates an example of the stop device 40 shown in FIG. 2A used with the decking 30 shown in FIG. 1. In FIG. 2B, the area below the top surface of the decking 30 is illustrated, and the stop device 40 has been lowered or inserted into a clearance aperture around a roller in the decking 30. As shown, only the top of the roller 31, among other rollers, extends above the top surface of the decking 30, and the roller 31 is supported below the top surface of the decking 30. As noted above with reference to FIG. 1, the roller 31 is exposed, in part, through a respective clearance aperture in the top surface of the decking 30.

As shown in FIG. 2B, a bottom edge of the socket 50 of the stop device 40 has been inserted into a clearance aperture around a roller in the decking 30, and the brim 60 of the stop device 40 is resting upon the top surface of the decking 30. Thus, a bottom portion of the socket 50 extends below the top surface of the decking 30. The top portion of the socket 50, which is still above the top surface of the decking 30, can provide a type of bumper or other mechanical interference against the movement of the ULD 20 on the decking 30.

Figure 3A:
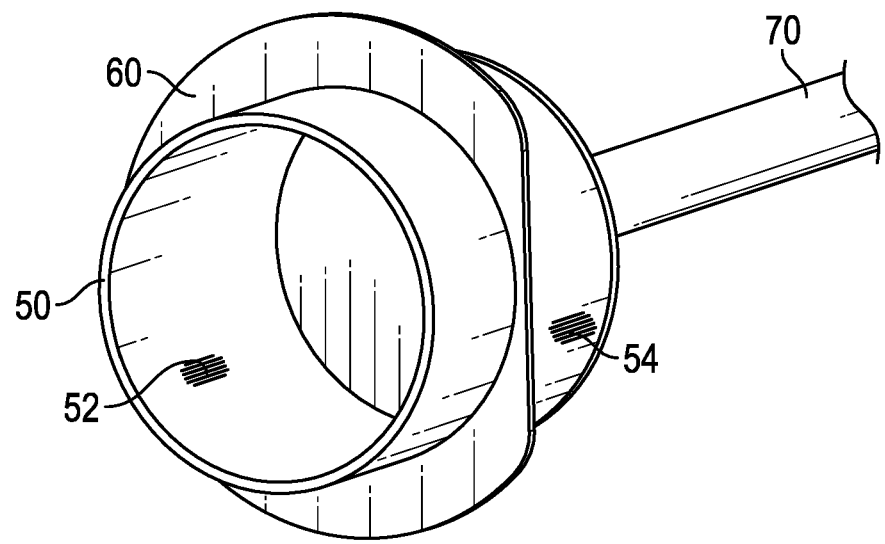
FIG. 3A illustrates a bottom perspective view of the example stop device shown in FIG. 2A according to various aspects of the embodiments of the present disclosure.

FIG. 3A illustrates a bottom perspective view of the stop device 40. The socket 50, brim 60, and rod 70 of the stop device 40 are shown in FIG. 3A. The socket 50 is cylindrical and includes an inner surface 52 and an outer surface 54. One end of the socket 50 is open and another end of the socket 50 is closed or capped, as shown in FIG. 3A. The interior of the socket 50 is open or hollow, and the open end of the socket 50 can fit around the rollers 31-33 in the decking 30, among others. An end of the rod 70 is secured to the closed or capped end of the socket 50.

The socket 50 can be formed to any suitable size. The diameter of the socket 50 can be selected based on the size of the clearance apertures around the rollers 31-33 in the decking 30, so that the socket 50 can fit into the clearance apertures. The brim 60 extends out perpendicular (or substantially perpendicular) to the outer surface 54 of the socket 50. The brim 60 can extend any suitable distance out from the outer surface 54 of the socket 50, such as between 1-3 inches from the outer surface 54, although other sizes can be relied upon.

Figure 3B:
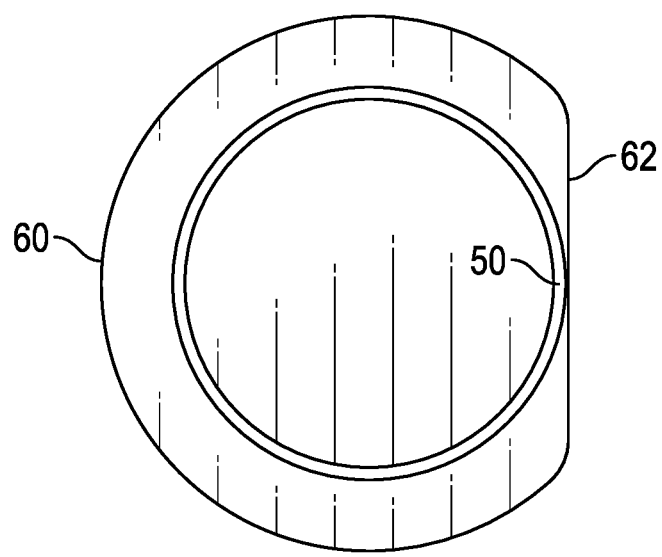
FIG. 3B illustrates a bottom view of the example stop device shown in FIG. 2A according to various aspects of the embodiments of the present disclosure.

FIG. 3B illustrates a bottom view of the socket 50 and the brim 60 of the stop device 40. The brim 60 includes a circular segment cutout. As best shown in FIG. 3B, a chord 62 of the circular segment cutout extends substantially tangentially to the outer surface of the cylindrical socket 50. In other words, the chord 62 extends in a straight line, and a point along the chord 62 touches or nearly touches (e.g., extends within about ⅟32 inch to 3/16 inch) the outer surface 54 of the socket 50. As described in further detail below, the stop device 40 can be rotated while being inserted into a clearance aperture in the decking (and after being inserted). In use, the stop device 40 can be rotated to align the chord 62 of the brim 60 with an edge of the ULD 20, to drop or raise the stop device 40 past a bottom edge of the ULD as described below.

Figure 4A:
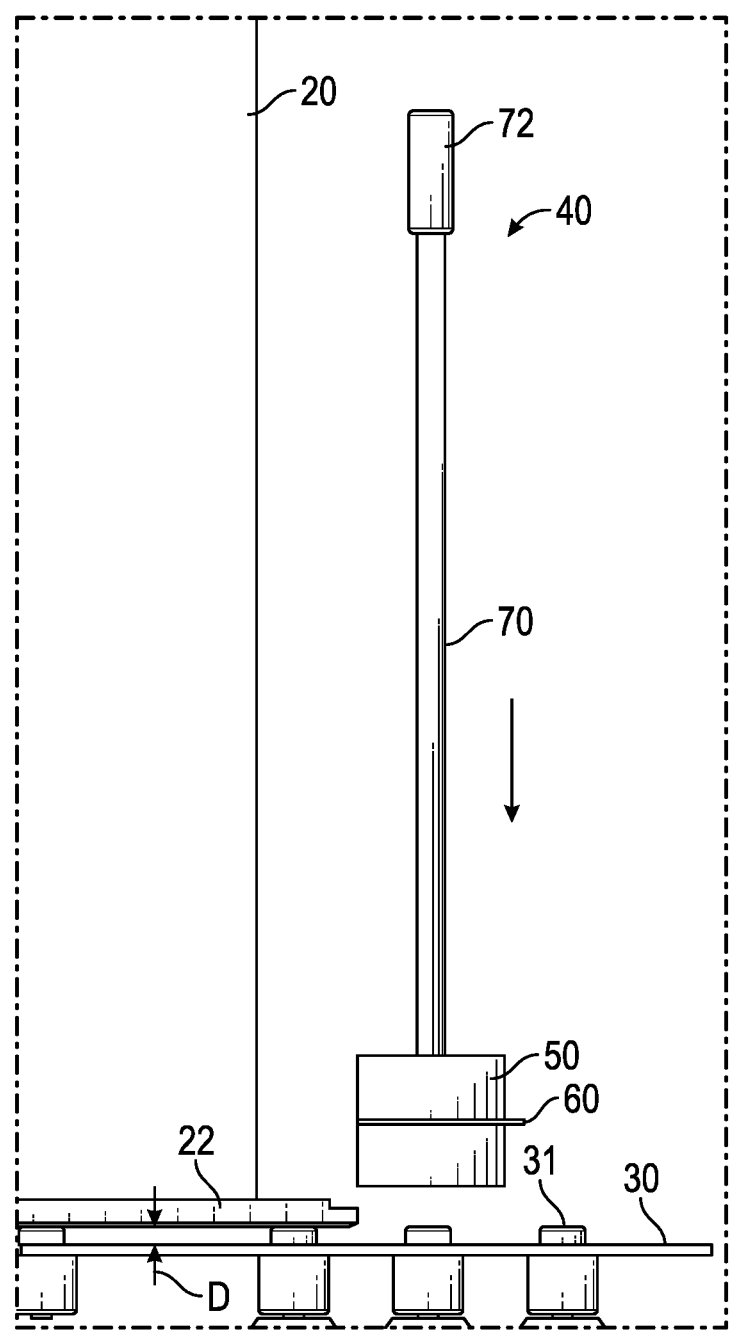
FIG. 4A illustrates a side view of the example stop device shown in FIG. 2A positioned for insertion into decking according to various aspects of the embodiments of the present disclosure.

FIG. 4A illustrates a side view of the stop device 40 positioned for insertion into the decking 30, to block movement of the ULD 20 in at least one direction. In FIG. 4A, the ULD 20 is shown resting on the rollers of the decking 30, and the roller 31 is particularly referenced as an example of the rollers. The rollers hold the ULD 20 up at a distance "D" over the top surface of the decking 30 as shown. The bottom edge 22 of the ULD 20 extends out around a bottom periphery of the ULD 20 and provides a bottom surface to support the ULD 20 over the decking 30.

As shown in FIG. 4A, the stop device 40 has been rotated such that the circular segment cutout of the brim 60 is aligned with the bottom edge 22 of the ULD 20. Particularly, the brim 60 is shown to extend off to the right off the socket 50 but not shown off the left of the socket 50, because the circular segment cutout of the brim 60 is aligned with the bottom edge 22 of the ULD 20. In this alignment, the stop device 40 can be lowered down into a clearance aperture of the decking 30 without mechanical interference between the brim 60 and the bottom edge 22 of the ULD 20.

Figure 4B:
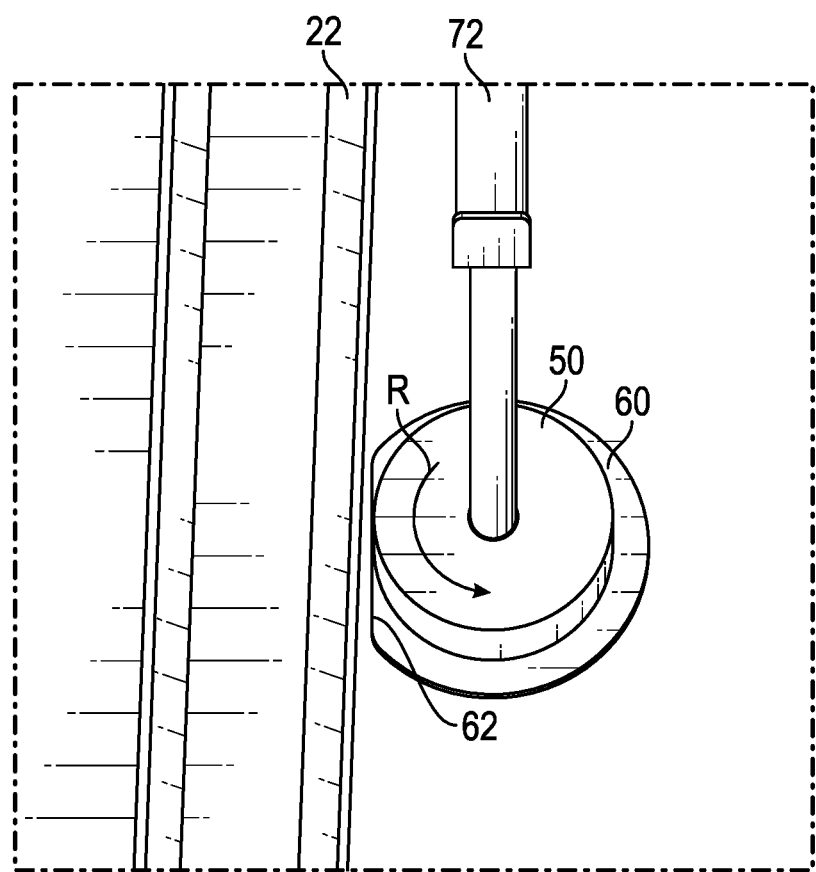
FIG. 4B illustrates an example of dropping the stop device shown in FIG. 2A into decking according to various aspects of the embodiments of the present disclosure.

FIG. 4B illustrates an example of how the stop device 40 can be positioned under the bottom edge 22 of the ULD 20 for locking. In FIG. 4B, the stop device 40 has been lowered into a clearance aperture in the decking 30, and the brim 60 is in contact with the top surface of the decking 30. As shown, the chord 62 of the brim 60 is aligned (e.g., substantially parallel) with the bottom edge 22 of the ULD 20. Because the bottom edge 22 of the ULD 20 is raised up at a distance "D" over the top surface of the decking 30 (see FIG. 4A), the brim 60 rests on the decking 30 below the bottom edge 22 of the ULD 20.

Once the stop device 40 has been lowered into the decking 30, it provides a mechanical interference against the free movement of the ULD 20. Particularly, the bottom edge 22 of the ULD 20 can contact and bump up against the socket 50 of the stop device 40, preventing the ULD 20 from rolling past the stop device 40.

Figure 4C:
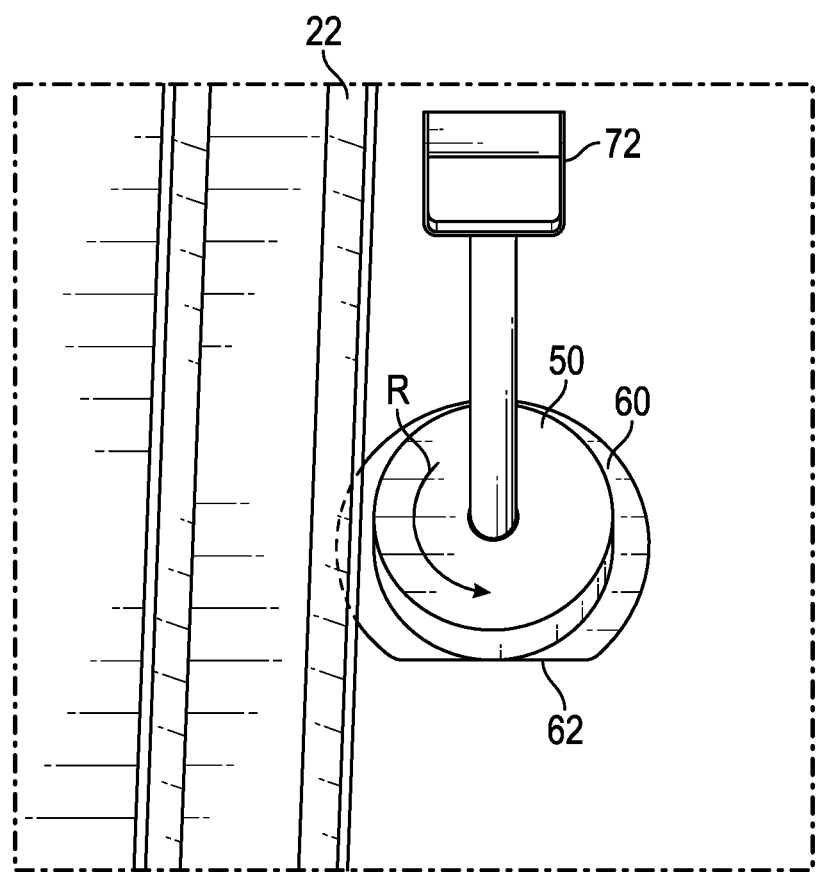
FIG. 4C illustrates an example of the stop device shown in FIG. 2A with a brim of the stop device rotated under a ULD according to various aspects of the embodiments of the present disclosure.

FIG. 4C illustrates an example of locking the stop device 40 under the bottom edge 22 of the ULD 20. From the position shown in FIG. 4B, if the stop device 40 is rotated in the direction "R," as shown in FIG. 4C, then the brim 60 will rotate underneath the bottom edge 22 of the ULD 20. The bottom edge 22 of the ULD 20 can still contact the outer surface of the socket 50 even when a portion of the brim 60 is rotated under the bottom edge 22 of the ULD 20 as shown in FIG. 4C. From the position shown, the stop device 40 cannot be lifted up off the decking 30, because a portion of the brim 60 is under the bottom edge 22 of the ULD 20 (see hidden line in FIG. 4C). The stop device 40 is effectively locked in place on the decking 30 as shown in FIG. 4C.

The stop device 40 can be removed, however, if rotated so that the chord 62 of the brim 60 is again aligned with the bottom edge 22 of the ULD 20 as shown in FIG. 4B. Thus, the stop device 40 can be rotated to secure it in place on the decking 30, when a portion of the brim 60 is under the ULD 20. The stop device 40 can also be rotated to remove it from the decking 30, even if the bottom edge 22 of the ULD 20 contacts the socket 50, when the chord 62 of the brim 60 is again aligned with the bottom edge 22 of the ULD 20.

Figure 5A:
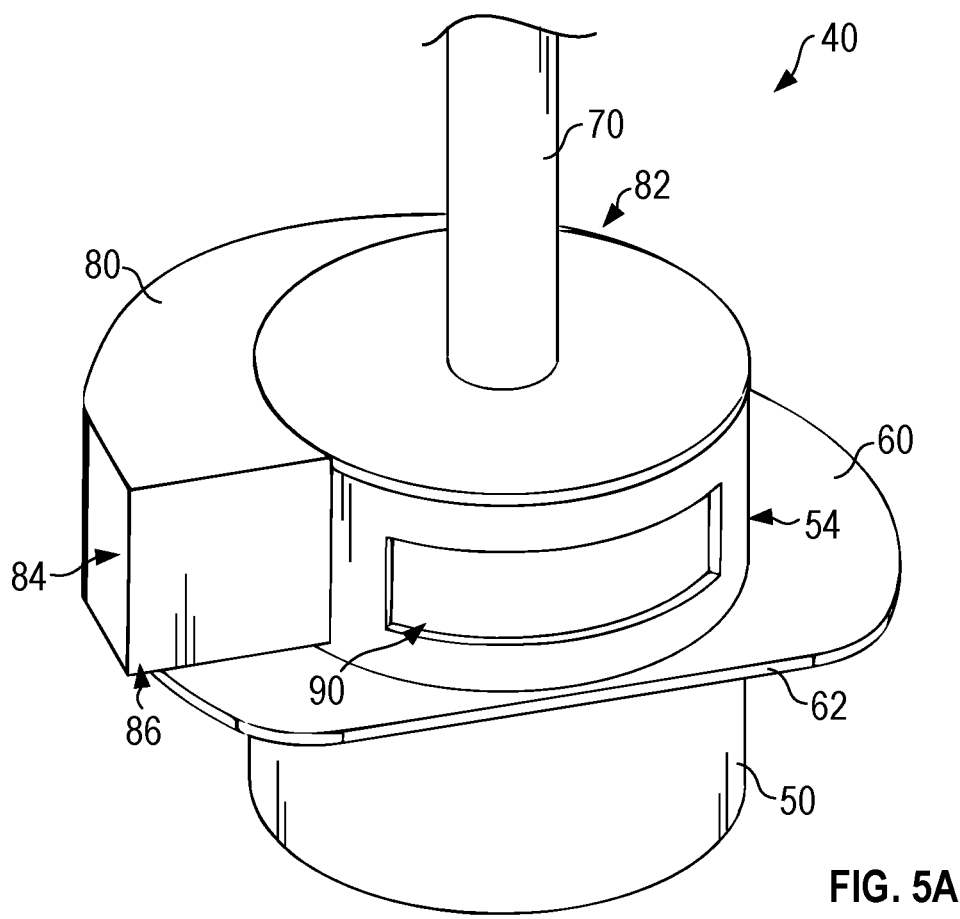
FIG. 5A illustrates a perspective view of the example stop device shown in FIG. 2A, including a cam body and a radial opening, according to various aspects of the embodiments of the present disclosure.
Figure 5B:
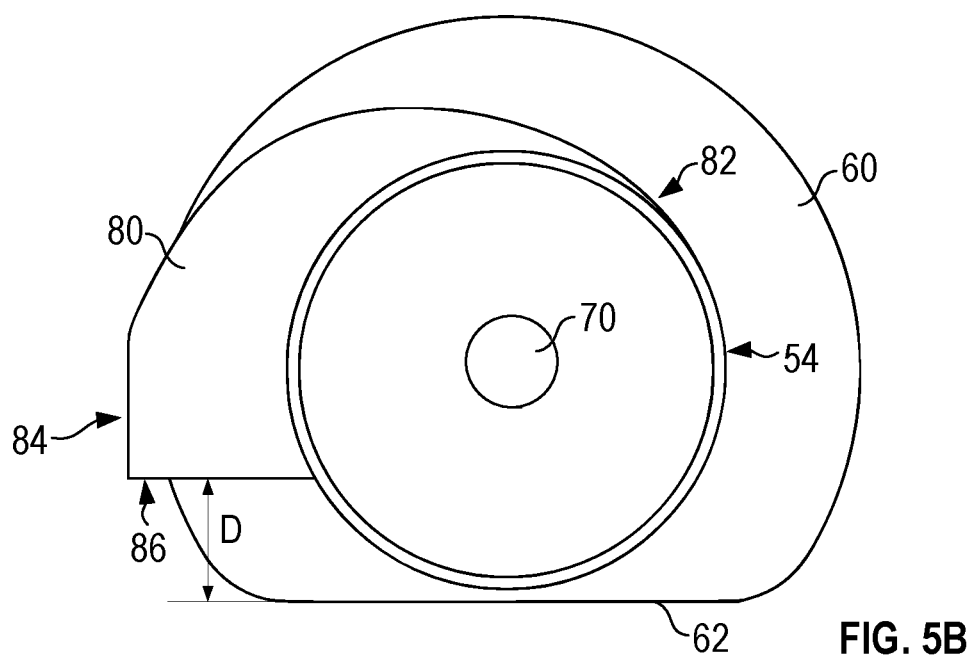
FIG. 5B illustrates a top-down view of the example stop device shown in FIG. 5A according to various aspects of the embodiments of the present disclosure.

FIG. 5A illustrates a perspective view of the stop device 40, including a cam body 80 and a radial opening 90, and FIG. 5B illustrates a top-down view of the example stop device 40 shown in FIG. 5A. As shown in FIGS. 5A and 5B, the stop device 40 can also include the cam body 80, which extends around a portion of the cylindrical socket 50 above the brim 60. The cam body 80 is illustrated as a representative example in FIG. 5A, and the cam body 80 can vary in size and position as compared to that shown among the embodiments. The cam body 80 can be a separately-formed structure and be secured around the cylindrical socket 50 in any suitable way, including by one or more mechanical fasteners, welds, adhesives, or combinations thereof.

The cam body 80 includes a tapered end 82 that extends substantially tangentially off of the outer surface 54 of the cylindrical socket 50. The cam body 80 also includes an expanded end 84 with a flat surface 86. As best shown in FIG. 5B, the flat surface 86 of the cam body 80 extends substantially perpendicular to the chord 62 of the circular segment cutout of the brim 60, at a predetermined spacing or distance "D" from the chord 62. The size or width of the cam body 80 expands from a smallest size at the tapered end 82 to a largest size at the expanded end 84. As described in further detail below with reference to FIG. 5C, the cam body 80 can be used in various ways, including to occupy space between the outer surface 54 of the socket 50 and the bottom edge 22 of the ULD 20, and to help push the stop device 40 off and away from the bottom edge 22 of a ULD 20.

The radial opening 90 is a rectangular aperture formed through the outer surface 54 and the inner surface 52 of the cylindrical socket 50. The radial opening 90 is illustrated as a representative example in FIG. 5A, and the radial opening 90 can vary in length, width, and position as compared to that shown among the embodiments. As described in further detail below with reference to FIG. 5D, the radial opening 90 can be relied upon to seat a corner edge of the ULD 20, helping to hold the ULD 20 in place.

Figure 5C:
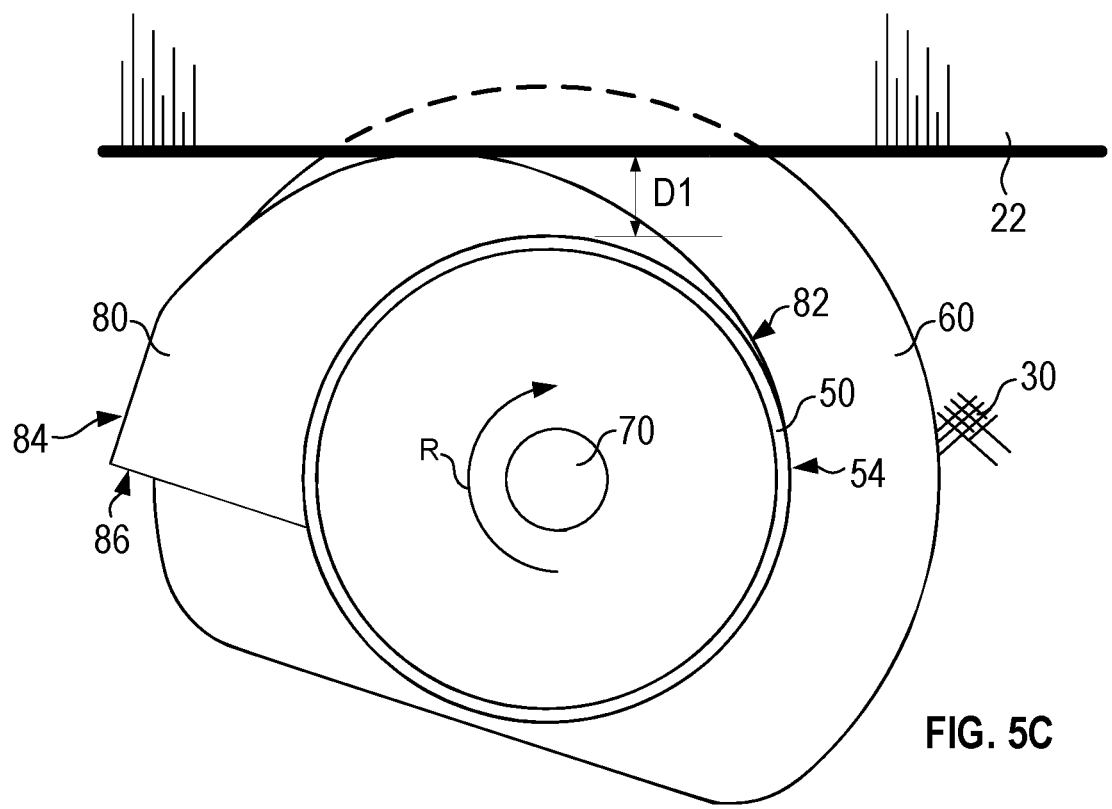
FIG. 5C illustrates a top-down view of the example stop device shown in FIG. 5A, in use, according to various aspects of the embodiments of the present disclosure.

FIG. 5C illustrates a top-down view of the example stop device 40 shown in FIGS. 5A and 5B, in one example use case. The handle 72 is omitted from view in FIG. 5C for simplicity. In FIG. 5C, the stop device 40 has been inserted into the decking 30, and the bottom edge 22 of the ULD 20 is in contact with the stop device 40. Particularly, the bottom edge 22 of the ULD 20 is in contact with the outer surface of the cam body 80, rather than the outer surface 54 of the socket 50. Thus, the cam body 80 can be relied upon to occupy the space "Dl" between the bottom edge 22 of the ULD 20 and the socket 50, helping to hold the ULD 20 in place. Additionally, as the stop device 40 is rotated further in the direction "R" using the handle 72 (not shown in FIG. 5C), the distance or space "Dl" between the bottom edge 22 of the ULD 20 and the socket 50 can be made to increase, pushing the ULD 20 apart or away from the socket 50 of the stop device 40.

Figure 5D:
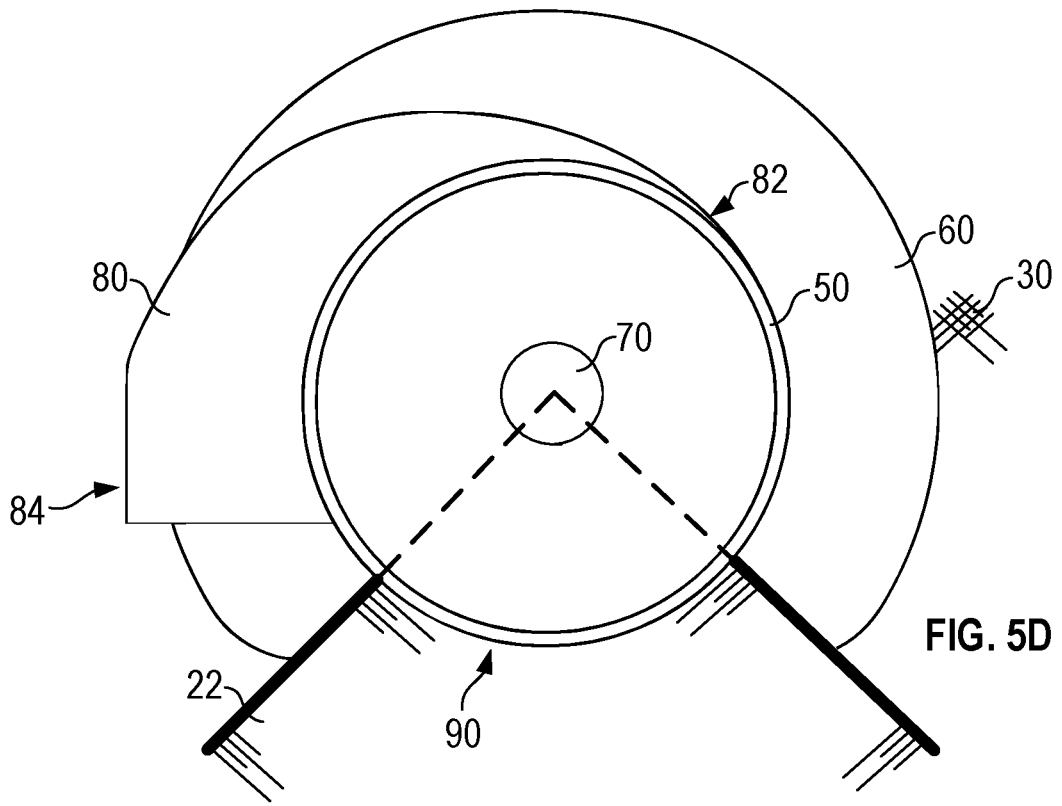
FIG. 5D illustrates a top-down view of the example stop device shown in FIG. 5A, in another use, according to various aspects of the embodiments of the present disclosure.

FIG. 5D illustrates a top-down view of the example stop device shown in FIG. 5A, in another example use case. In FIG. 5D, the stop device 40 has been inserted into the decking 30, and a corner of the bottom edge 22 of the ULD 20 extends through the radial opening 90 in the socket 50. The radial opening 90 is relied upon to seat the corner of the ULD 20 into the stop device 40 in this example, helping to hold the ULD 20 in place at its corner. The dashed or hidden lines in FIG. 5D illustrate an example of the extent to which the corner of the bottom edge 22 extends within the socket 50. The radial opening 90 can be formed to be wider or more narrow as compared to that shown in FIG. 5A. The corner of the ULD 20 will extend to a greater extent into the socket 50 if the radial opening 90 is wider than that shown in FIG. 5A, and the corner of the ULD 20 will extend to a lesser extent into the socket 50 if the radial opening 90 is more narrow than that shown in FIG. 5A.

Figure 6:
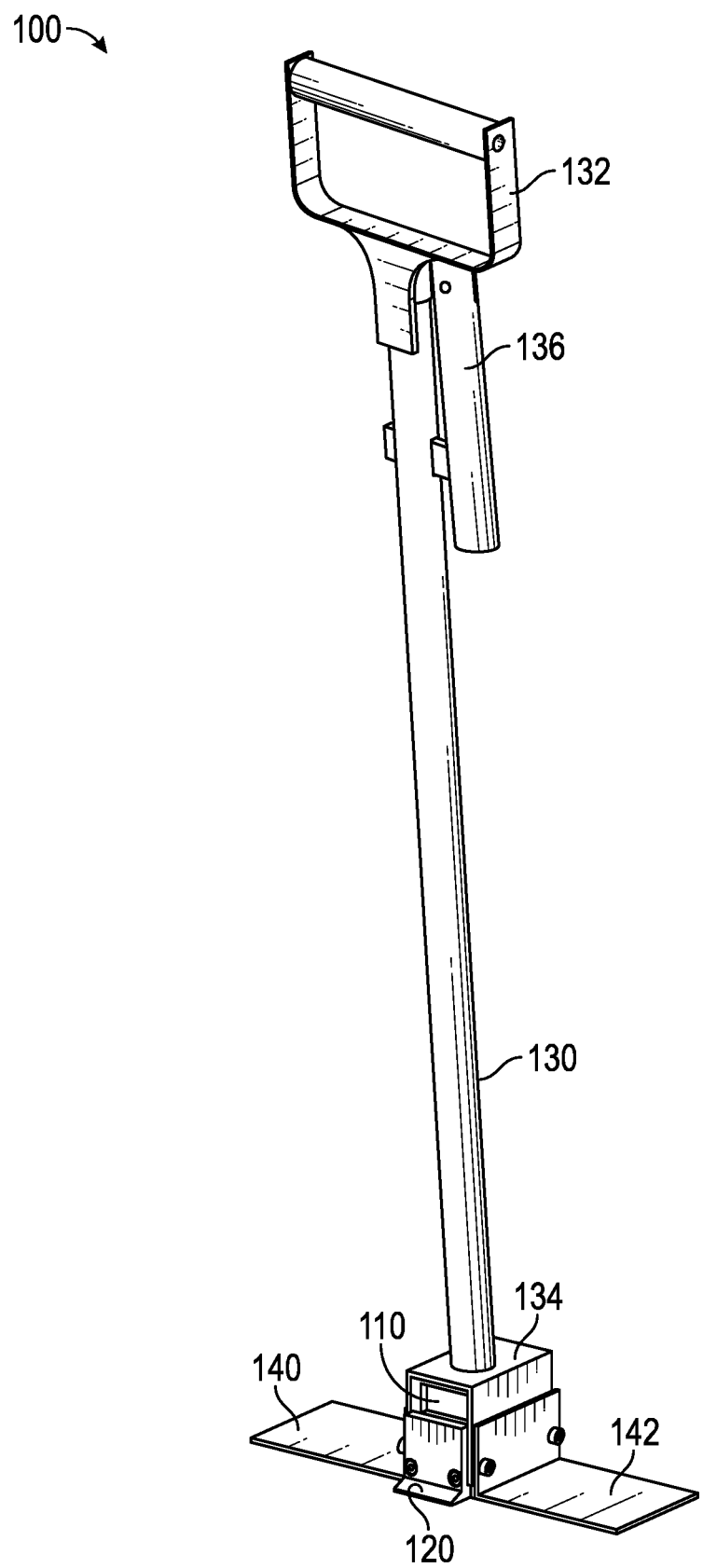
FIG. 6 illustrates another example stop device according to various aspects of the embodiments of the present disclosure.

FIG. 6 illustrates another example stop device 100 according to various aspects of the embodiments of the present disclosure. The stop device 100 is not drawn to scale or exact proportions in FIG. 6 but is provided as a representative example to convey the concepts of the embodiments. The stop device 100 includes a switchable magnet 110, an interface bumper 120 secured over a side surface of the switchable magnet 110, and a handle rod assembly for positioning the switchable magnet 110 on decking. The handle rod assembly includes a coupling 134, a rod 130 secured to the coupling 134 at a first end of the rod 130, and a handle 132 secured at a second end of the rod 130. The handle rod assembly also includes a locking lever 136, below the handle 132, to actuate the switchable magnet 110 as described in further detail below. The switchable magnet 110 is secured within the coupling 134 and, thus, to the handle 132 through the rod 130. The stop device 100 also includes a first foot plate 140 and a second foot plate 142 secured, respectively, over opposing side surfaces of the switchable magnet 110. The first foot plate 140 and the second foot plate 142 can be omitted in some cases.

The stop device 100 can be formed from any suitable materials in any suitable way. Beyond the switchable magnet 110, the stop device 100 can preferably be formed from metal, including aluminum or steel, for example. In other cases, however, one or more components of the stop device 100 can be formed from other materials, including plastics, wood, rubber, and other materials. For example, the interface bumper 120 can be formed from a strong or rigid plastic.

The stop device 100 can be assembled from separate components and welded and/or secured together using mechanical fasteners at certain points. For example, the interface bumper 120, the first foot plate 140, and the second foot plate 142 can all be secured around the coupling 134 of the handle rod assembly using mechanical fasteners, such as threaded holes and screws, bolts, and other fastening means. The overall dimensions of the stop device 100 can vary based on number of factors, including ergonomic factors. The switchable magnet 110 can be embodied as any suitable type of switchable magnet. In one example, the switchable magnet 110 can be embodied as a MAGSWITCH® MagSquare switchable magnet, although other types of switchable magnet can be relied upon.

Rather than dropping into a clearance aperture of decking, as the stop device 40 is designed, the stop device 100 can magnetically engage with decking. Thus, the stop device 100 is designed for use with decking without apertures, for example, and can be used with a number of different types of decking, including the decking 30 shown in FIG. 1. The switchable magnet 110 can include an actuator for turning a magnetic field of the switchable magnet 110 on or off, and the actuator can be rotated to turn the magnetic field on or off. As described in further detail below, the actuator of the switchable magnet 110 can be controlled through a mechanical linkage that extends from the switchable magnet 110 to the locking lever 136 at the handle 132. Thus, the locking lever 136 can be used to turn the switchable magnet 110 on or off.

In one position of the locking lever 136, the switchable magnet 110 provides or exhibits a relatively strong magnetic field for adhering the stop device 100 to the decking 30. Particularly, the magnetic field of the switchable magnet 110 can engage through magnetic attraction to the diamond plate or other metallic surface of the decking 30. The magnetic field can provide hundreds of pounds of magnetic force when activated, such as 200-600 pounds of force, and the stop device 100 cannot be easily removed from the decking 30 under this level of magnetic attraction. In another position of the locking lever 136, the switchable magnet 110 does not provide or exhibit the magnetic field, and the stop device 100 can be easily removed from the decking 30 and repositioned to another location.

Figure 7:
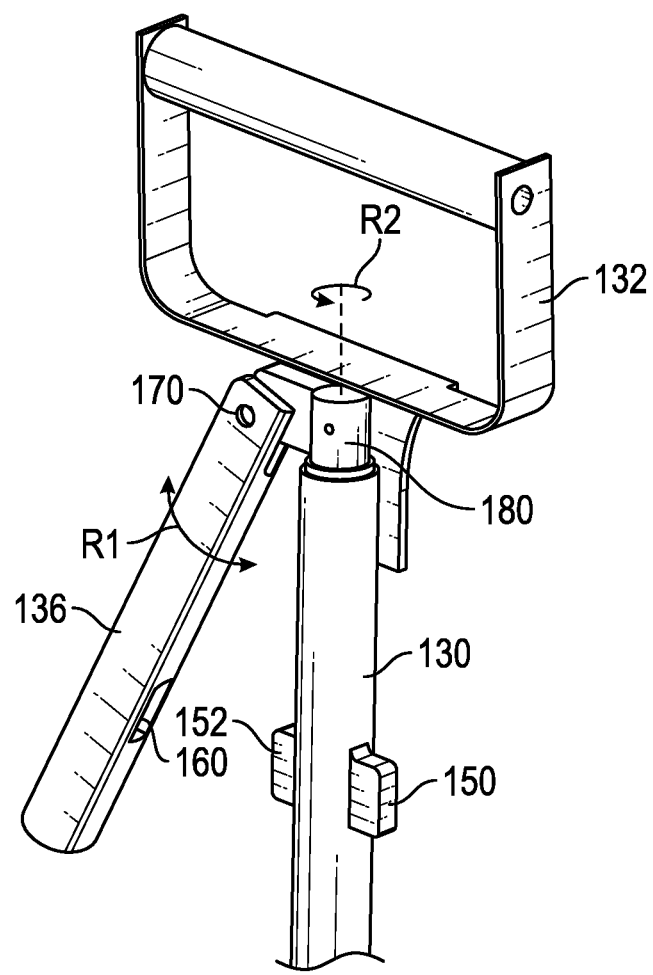
FIG. 7 illustrates an example handle and locking lever of the stop device shown in FIG. 6 according to various aspects of the embodiments of the present disclosure.

FIG. 7 illustrates a closer view of the handle 132 and the locking lever 136 of the stop device 100 shown in FIG. 6. The locking lever 136 is assembled to pivot in the direction "R1" about the pivot point 170. A mechanical linkage 180, which can be a cylindrical rod or sleeve, also extends down within the rod 130 to the actuator of the switchable magnet 110. The pivot point 170 is mechanically secured to the top of the mechanical linkage 180. Thus, the locking lever 136 can pivot both in the direction "R1" and also in the direction "R2." When pivoting in the direction "R2," the locking lever 136 is part of a mechanical linkage configured to turn the magnetic field of the switchable magnet 110 on or off.

As shown, the locking lever 136 includes a locking detent 160, and the rod 130 includes locking pegs 150 and 152 on opposite sides of the rod 130. Thus, the locking lever 136 can be folded or rotated down in the direction "R1" to rest against (e.g., parallel with) the rod 130. In this arrangement, the locking detent 160 can interlink over the locking peg 152, preventing the locking lever 136 from rotating around the rod 130. The switchable magnet 110 can be switched off in this configuration, for example. On the other hand, the locking lever 136 can be folded or rotated up in the direction "R1," away from the locking peg 152, and then rotated in the direction "R2" towards the locking peg 150 on the other side of the rod 130. The locking lever 136 can then be folded or rotated down in the direction "R1," so that the locking detent 160 can interlink over the locking peg 150. The switchable magnet 110 can be switched on in this configuration.

Figure 8A:
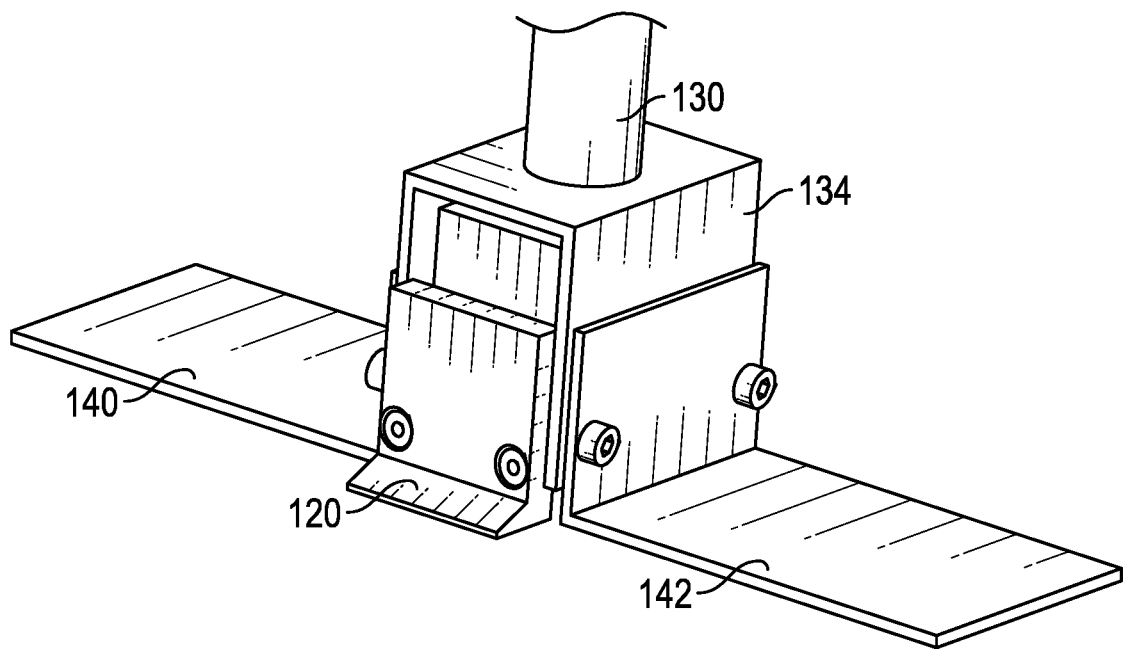
FIG. 8A illustrates a front of the stop device shown in FIG. 6 according to various aspects of the embodiments of the present disclosure.
Figure 8B:
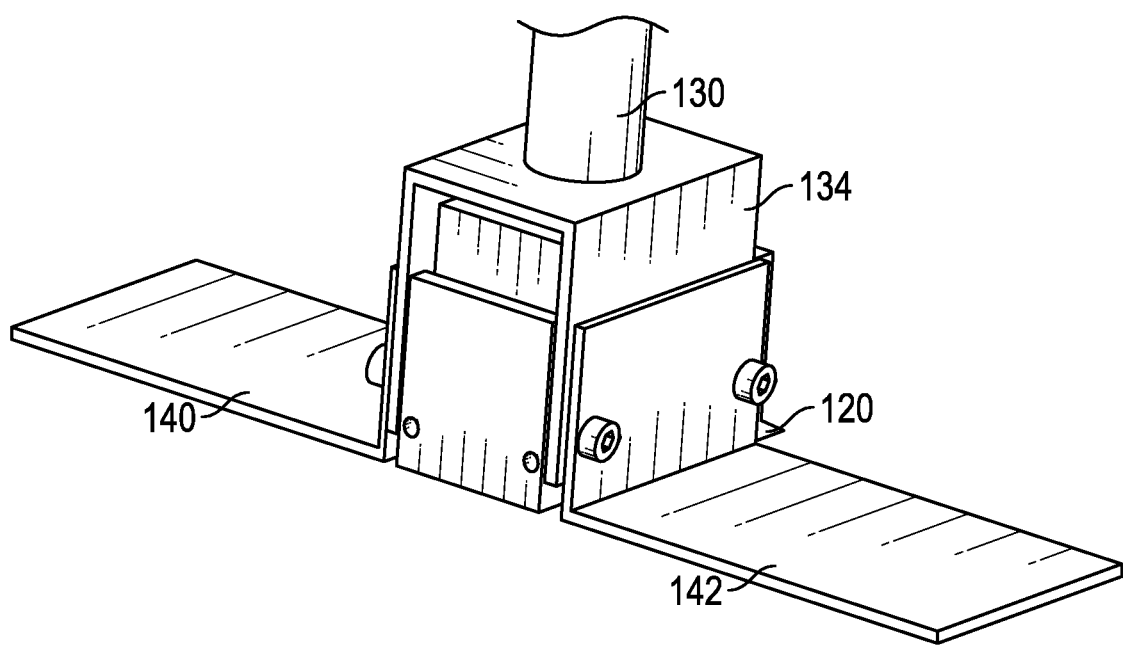
FIG. 8B illustrates a back of the stop device shown in FIG. 6 according to various aspects of the embodiments of the present disclosure.
Figure 8C:
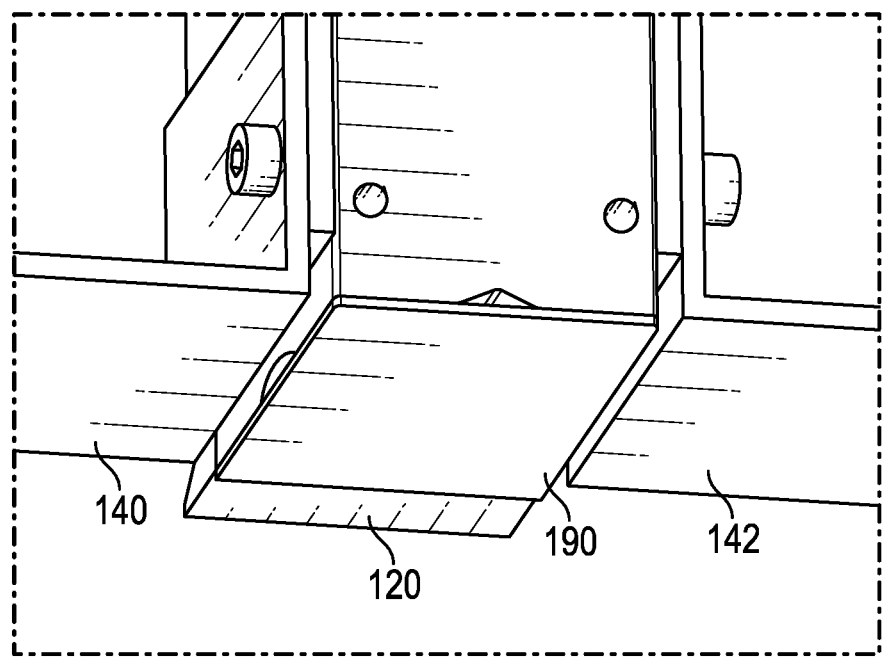
FIG. 8C illustrates a bottom of the stop device shown in FIG. 6 according to various aspects of the embodiments of the present disclosure.

FIG. 8A illustrates a front of the stop device 100, FIG. 8B illustrates a back of the stop device 100, and FIG. 8C illustrates a bottom of the stop device 100. In FIG. 8A, the interface bumper 120 is shown in greater detail. The interface bumper 120 includes an angled surface, and the purpose for the angled surface is described in greater detail below with reference to FIG. 9. The interface bumper 120 is illustrated as a representative example in FIG. 8A, and the interface bumper 120 can vary in size and proportions as compared to that shown.

Referring between FIGS. 8A and 8B, the first foot plate 140 and the second foot plate 142 are shown in greater detail. The first foot plate 140 and the second foot plate 142 can be formed from sheet metal, such as a sheet of diamond plate steel or aluminum. An individual can step on the first foot plate 140 and the second foot plate 142 when positioning the stop device 100 and before switching the switchable magnet 110 on.

Referring to FIG. 8C, the stop device 100 can include a friction pad 190, such as a rubber, foam, or other pad exhibiting a high coefficient of friction, secured to a bottom of the stop device 100. The friction pad 190 can be secured to the bottom of the stop device 100 using an adhesive or other fastening means. When the switchable magnet 110 of the stop device 100 is switched on, the friction pad 190 can help to maintain the stop device 100 in place and prevent the stop device 100 from slipping or moving on the decking 30.

Figure 9:
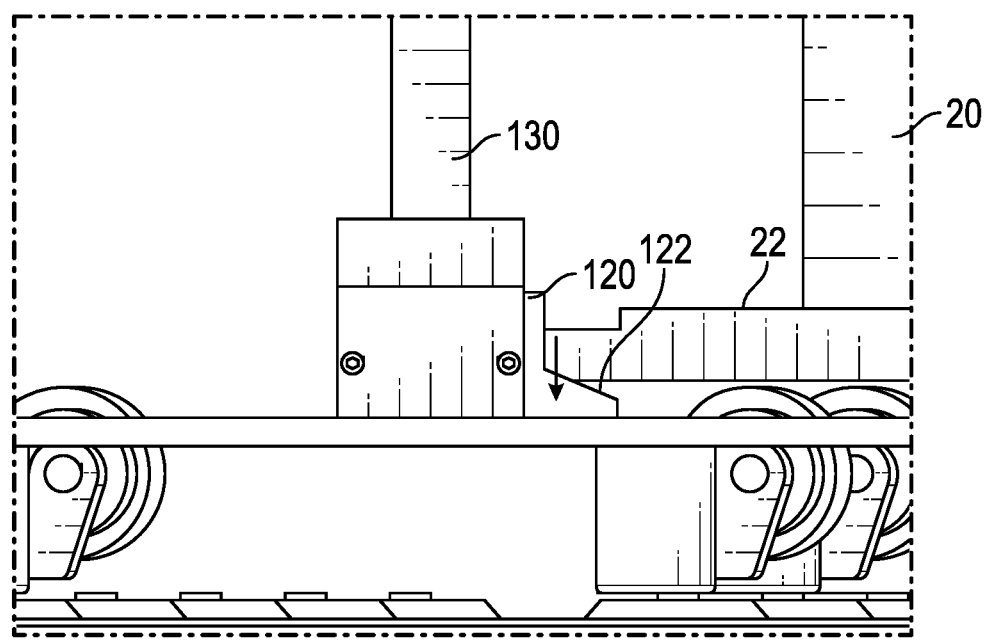
FIG. 9 illustrates the stop device shown in FIG. 6 when used to interfere with movement of a unit load device according to various aspects of the embodiments of the present disclosure.

FIG. 9 illustrates the stop device 100 shown in FIG. 6 when used to interfere with movement of the ULD 20. As shown, the stop device 100 is secured to the decking 30 using the switchable magnet 110 as described above. The bottom edge 22 of the ULD 20 is contacting the interface bumper 120 of the stop device 100. Particularly, the bottom edge 22 of the ULD 20 contacts the top angled surface 122 of the interface bumper 120. The top angled surface 122 is designed to deflect force from the bottom edge 22 of the ULD 20 toward a surface of the decking 30, helping to maintain the stop device 100 in place against lateral forces exerted on the stop device 100 by the ULD 20.

Figure 10A:
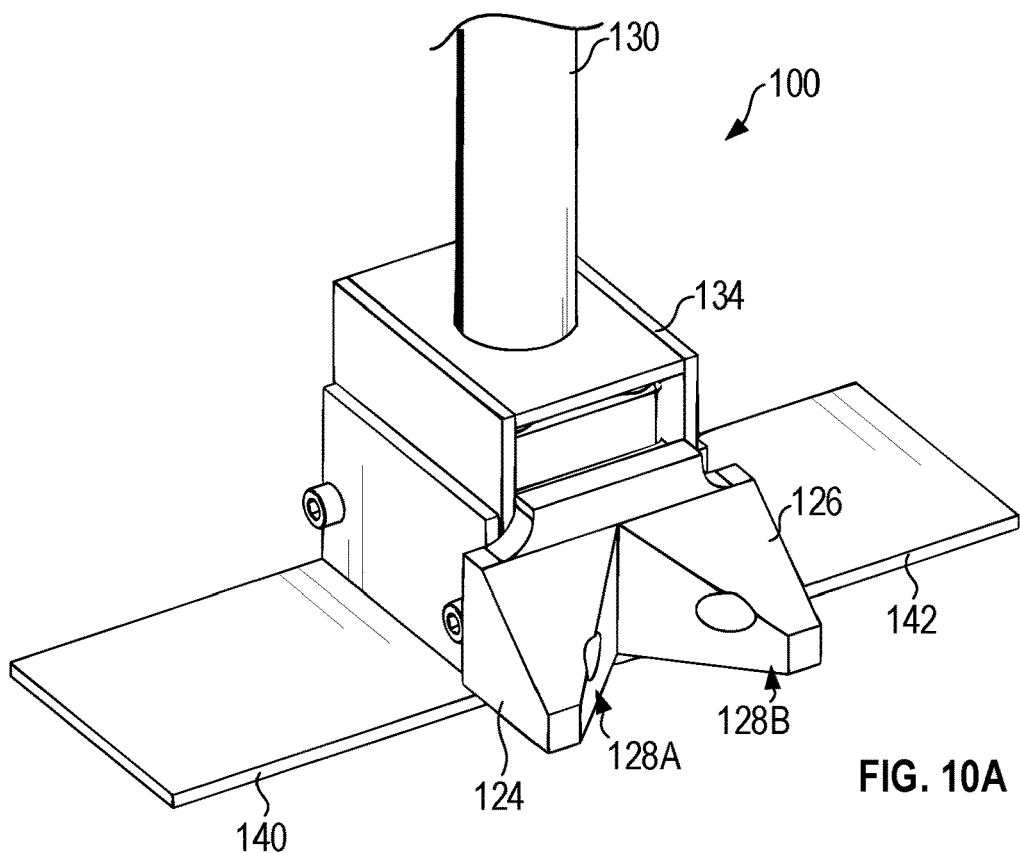
FIG. 10A illustrates a perspective view of the example stop device shown in FIG. 6, including a notched interface bumper, according to various aspects of the embodiments of the present disclosure.

FIG. 10A illustrates a perspective view of the example stop device 100 shown in FIG. 6, including a notched interface bumper 124, according to various aspects of the embodiments of the present disclosure. The notched interface bumper 124 is similar to the interface bumper 120 but is generally larger. The notched interface bumper 124 is illustrated as a representative example in FIG. 10A and can vary in size and proportions as compared to that shown. The notched interface bumper 124 can be a separately-formed structure and be secured over a side surface of the switchable magnet 110 in any suitable way, including by one or more mechanical fasteners, welds, adhesives, or combinations thereof.

The notched interface bumper 124 includes a top angled surface 126 designed to deflect force from the bottom edge 22 of the ULD 20 toward a surface of the decking 30, to help maintain the stop device 100 in place against lateral forces exerted on the stop device 100 by the ULD 20. Thus, the top angled surface 126 of the notched interface bumper 124 is similar to the top angled surface 122 of the interface bumper 120 and functions in a way that is similar to that described above with reference to FIG. 9.

The notched interface bumper 124 also includes a centrally-located notch between a first notch surface 126A and a second notch surface 126B. The first notch surface 126A and the second notch surface 126B can extend apart from each other at an angle of about 90 degrees in the example shown in FIG. 10A, although they can extend at other angles with respect to each other.

Figure 10B:
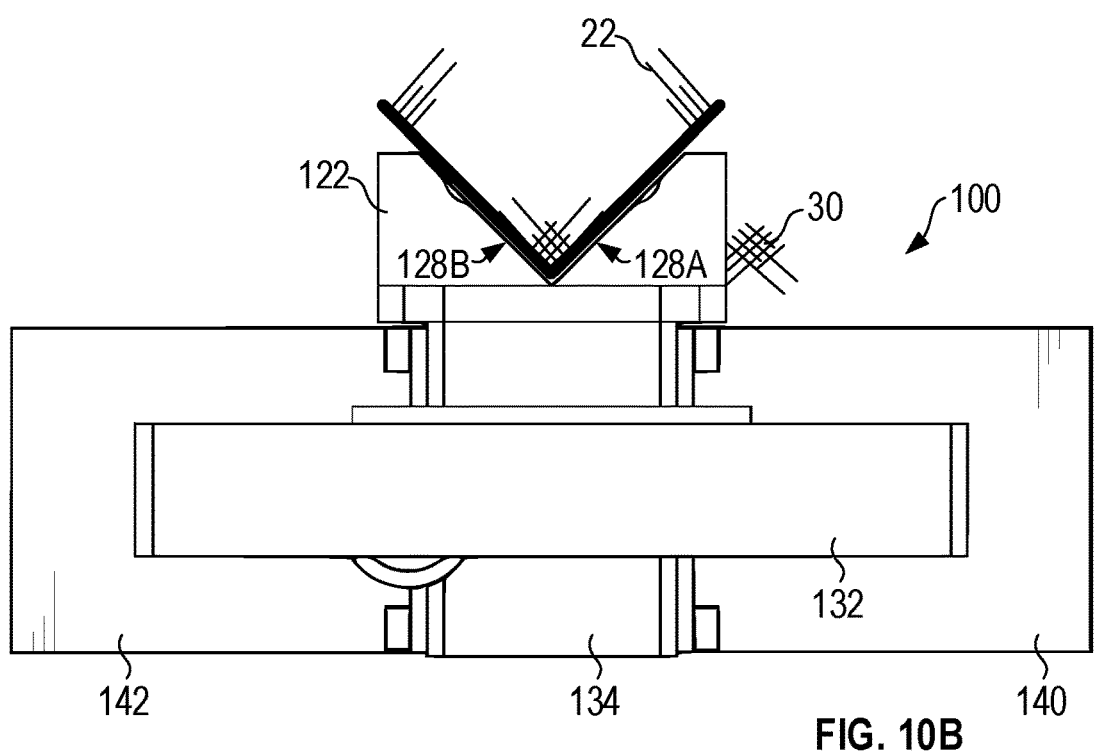
FIG. 10B illustrates a top-down view of the example stop device shown in FIG. 10A, in use, according to various aspects of the embodiments of the present disclosure.

FIG. 10B illustrates a top-down view of the example stop device 100 shown in FIG. 10A, in an example use case. As shown in FIG. 10B, the stop device 100 has been engaged on the decking 30, and a corner of the bottom edge 22 of the ULD 20 extends into the notch between the first notch surface 126A and the second notch surface 126B. The notched interface bumper 124 can thus be relied upon to seat the corner of the ULD 20 into the stop device 100 in this example, helping to hold the ULD 20 in place at its corner.

Figure 11:
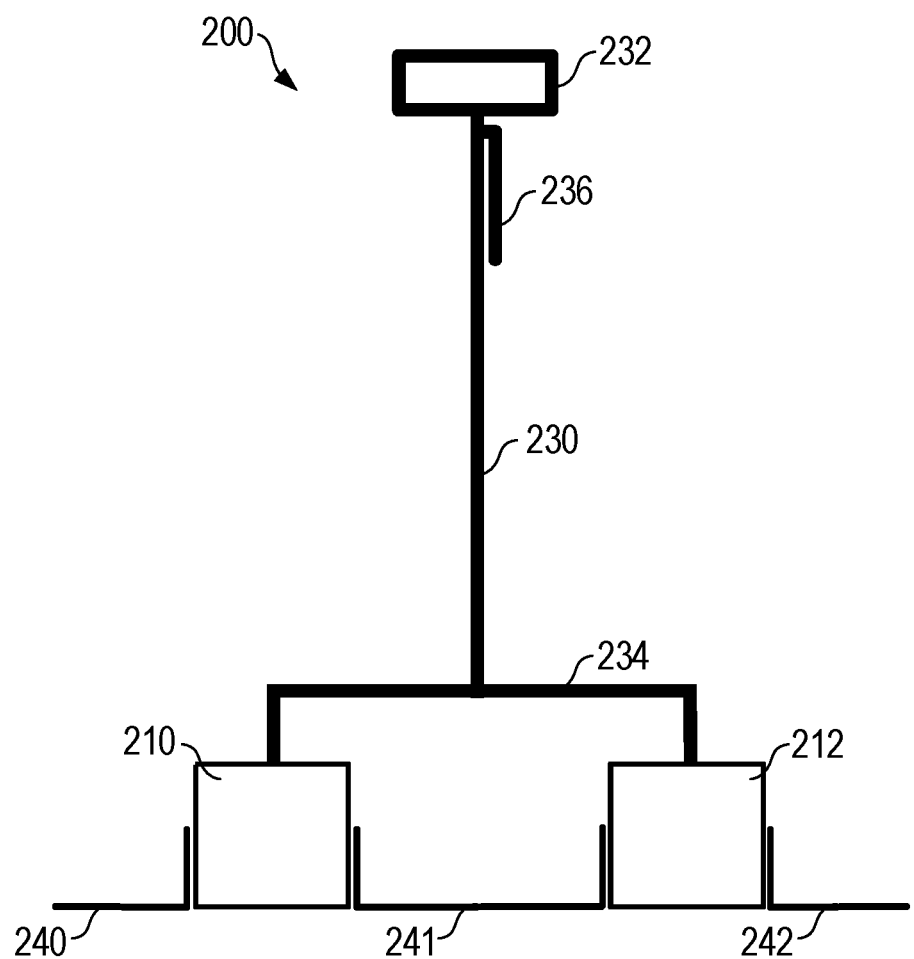
FIG. 11 illustrates another example stop device according to various aspects of the embodiments of the present disclosure.

FIG. 11 illustrates another example stop device 200 according to various aspects of the embodiments of the present disclosure. The stop device 200 is drawn in representative fashion in FIG. 11 and is not drawn to scale or exact proportions. The stop device 200 is similar to the stop device 100 shown in FIG. 6 but includes two spaced-apart switchable magnets 210 and 212. The stop device 200 also includes a handle rod assembly and foot plates 240-242. The handle rod assembly includes the rod 230, handle 232, coupling bar 234, and the locking lever 236. The stop device 200 is also similar in operation and function as compared to the stop device 100 shown in FIG. 6. However, when the locking lever 136 is rotated around the rod 230, a mechanical linkage in the rod 230 and the coupling bar 234 actuates both the switchable magnets 210 and 212 on or off.

Figure 12:
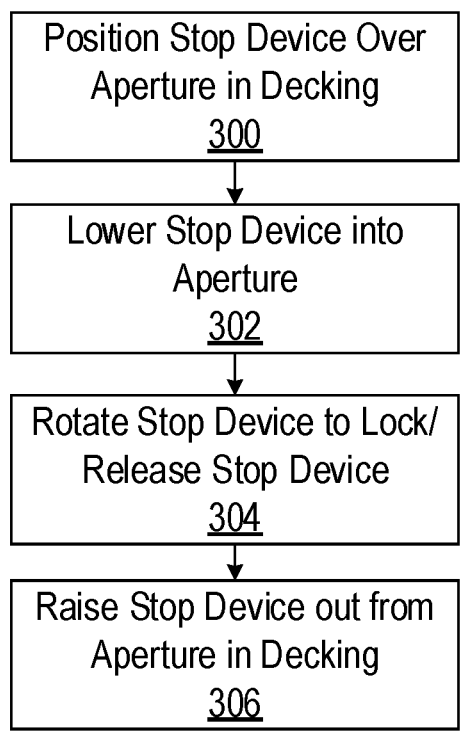
FIG. 12 illustrates a method of interfering with movement of a unit load device according to various aspects of the embodiments of the present disclosure.

FIG. 12 illustrates a method of interfering with movement of a unit load device according to various aspects of the embodiments of the present disclosure. The process shown in FIG. 12 is described in connection with the example stop device 40 shown in FIGS. 2A, 2B, 3A, 3B, 4A-4C, and 5A-5D, although similar stop devices can be used in the method. Although the process diagram shows an order of certain steps, the order can differ from that which is shown. For example, the order of two or more steps can be switched relative to the order shown or as described below. Also, two or more steps shown in succession can be performed at the same time or with partial concurrence.

At step 300, the method includes positioning the stop device 40 over a clearance aperture in decking, such as the decking 30 shown in FIG. 1. Here, an individual can use the handle 72 of the stop device 40 to position the stop device 40. As noted above, the stop device 40 includes a socket 50 comprising an open end. The interior of the socket 50 is open or hollow, and the socket 50 can be lowered into a clearance aperture around one of the rollers 31-33, among others, in the decking 30.

At step 302, the method includes lowering the stop device 40 into the clearance aperture. An individual can use the handle 72 of the stop device 40 to lower the socket 50 of the stop device 40 in this step. As described above with reference to FIG. 2B, a bottom edge of the socket 50 can be inserted into the clearance aperture around a roller in the decking 30, until the brim 60 of the stop device 40 rests upon the top surface of the decking 30. A bottom portion of the socket 50 will extend below the top surface of the decking 30, and the top portion of the socket 50 can provide a type of bumper or other mechanical interference against the movement of the ULD 20, for example, on the decking 30. Once the stop device 40 has been lowered into the decking 30, it can provide a mechanical interference against the free movement of the ULD 20 in at least one direction as described herein.

At step 304, the method includes rotating the stop device 40 to align the circular segment cutout of the brim 60 with the ULD 20. Again, an individual can use the handle 72 of the stop device 40 to rotate the stop device 40. The stop device 40 can be rotated to align the circular segment cutout of the brim 60 for lowering and locking the stop device 40 or for releasing and removing the stop device 40. For example, as shown in FIG. 4B, the chord 62 of the brim 60 is aligned (e.g., substantially parallel) with the bottom edge 22 of the ULD 20. Because the bottom edge 22 of the ULD 20 is raised up at a distance "D" over the top surface of the decking 30 (see FIG. 4A), the brim 60 rests on the decking 30 below the bottom edge 22 of the ULD 20.

From the position shown in FIG. 4B, if the stop device 40 is rotated in the direction "R," then the brim 60 will rotate underneath the bottom edge 22 of the ULD 20, as shown in FIG. 4C. The bottom edge 22 of the ULD 20 can still contact the stop device 40 even when a portion of the brim 60 is rotated under the ULD 20. In that case, the stop device 40 cannot be lifted up off the decking 30 because the brim 60 is under the bottom edge 22 of the ULD 20. The stop device 40 is effectively locked in place on the decking 30 in this case. The stop device 40 can be removed, however, if it is rotated so that the chord 62 of the brim 60 is again aligned with the bottom edge 22 of the ULD 20 as shown in FIG. 4B. Thus, the stop device 40 can be rotated to secure it in place on the decking 30, when a portion of the brim 60 is under the ULD 20. The stop device 40 can also be rotated to remove it from the decking 30, even if the bottom edge 22 of the ULD 20 contacts the socket 50, when the chord 62 of the brim 60 is again aligned with the bottom edge 22 of the ULD 20.

At step 306, the method includes raising the stop device 40 out from the clearance aperture in the decking 30. Again, an individual can use the handle 72 of the stop device 40 to raise the stop device 40 out from the clearance aperture in the decking 30.

Figure 13:
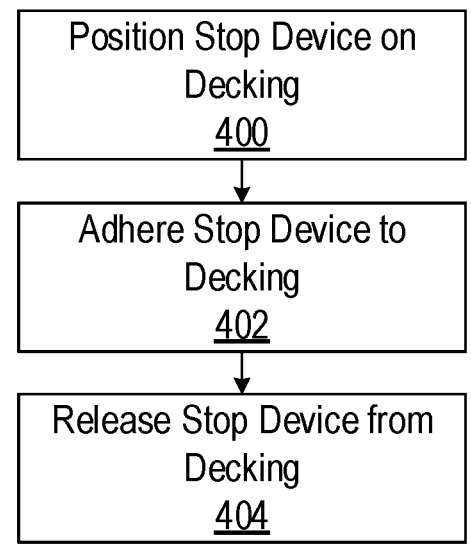
FIG. 13 illustrates another method of interfering with movement of a unit load device according to various aspects of the embodiments of the present disclosure.

FIG. 13 illustrates another method of interfering with movement of a unit load device according to various aspects of the embodiments of the present disclosure. The process shown in FIG. 13 is described in connection with the example stop device 100 shown in FIGS. 6, 7, 8A-8C, 9, and 10A-10B although similar stop devices can be used in the method. Although the process diagram shows an order of certain steps, the order can differ from that which is shown. For example, the order of two or more steps can be switched relative to the order shown or as described below. Also, two or more steps shown in succession can be performed at the same time or with partial concurrence.

At step 400, the method includes positioning the stop device 100 at a suitable location on the decking, such as the decking 30 shown in FIG. 1. Here, an individual can use the handle 132 of the stop device 100 to position the stop device 100. The stop device 100 can be positioned at any suitable location on the decking 30 and is not limited to positions with clearance apertures.

At step 402, the method includes adhering the stop device 100 to the decking, such as the decking 30 shown in FIG. 1. An individual can engage the switchable magnet 110 to the decking 30 by turning the switchable magnet 110 on. As described above with reference to FIG. 7, the locking lever 136 can be folded or rotated down in the direction "R1" to rest against (e.g., parallel with) the rod 130. The locking detent 160 can interlink over the locking peg 150 in this arrangement, preventing the locking lever 136 from rotating around the rod 130. The switchable magnet 110 can be switched on in this configuration to engage the stop device 100 to the decking 30 using magnetic attraction to the metallic surface of the decking 30.

At step 404, the method includes releasing the stop device 100 from the decking 30. Here, an individual can rotate the locking lever 136 up in the direction "R1" and then in the direction "R2" towards the locking peg 152 on the other side of the rod 130. The locking lever 136 can then be folded or rotated down in the direction "R1," so that the locking detent 160 can interlink over the locking peg 152. The switchable magnet 110 can be switched off in this configuration to release the stop device 100 from the decking 30.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, the following is claimed:

1. A system for interfering with movement of a unit load device on decking, comprising:
   an area of decking for supporting the unit load device; and
   a stop device for holding the unit load device in place at a location on the decking, the stop device comprising:
   a switchable magnet comprising an actuator;
   an interface bumper secured over a first surface of the switchable magnet;
   a foot plate secured over a second surface of the switchable magnet; and
   a handle rod assembly that extends from the switchable magnet for positioning the switchable magnet on the decking.

2. The system according to claim 1, wherein the handle rod assembly comprises:
   a coupling, the switchable magnet being secured with the coupling;
   a rod secured to the coupling at a first end of the rod; and
   a handle secured to the rod at a second end of the rod.

3. The system according to claim 2, wherein the handle rod assembly further comprises:

a switch linkage, the switch linkage extending from the actuator of the switchable magnet to the second end of the rod; and a locking lever to rotate the switch linkage and the actuator of the switchable magnet.

4. The system according to claim 3, wherein the interface bumper comprises a corner notch to seat a corner edge of the unit load device.

5. A stop device for interfering with movement of a unit load device on decking, comprising:

a switchable magnet comprising an actuator;

an interface bumper secured over a side surface of the switchable magnet; and a handle rod assembly that extends from the switchable magnet for positioning the switchable magnet on the decking.

6. The stop device according to claim 5, wherein:

the switchable magnet provides a magnetic field for engaging the stop device with the decking in a first position of the actuator; and the switchable magnet impedes the magnetic field for releasing the stop device from the decking in a second position of the actuator.

7. The stop device according to claim 5, wherein the handle rod assembly comprises:

a coupling, the switchable magnet being secured with the coupling;

a rod secured to the coupling at a first end of the rod; and a handle secured to the rod at a second end of the rod.

8. The stop device according to claim 7, wherein the handle rod assembly further comprises a switch linkage, the switch linkage extending from the actuator of the switchable magnet to the second end of the rod.

9. The stop device according to claim 8, wherein the handle rod assembly further comprises a locking lever to rotate the switch linkage and the actuator of the switchable magnet.

10. The stop device according to claim 9, wherein:

the locking lever comprises a locking detent; and the handle rod assembly further comprises a locking peg on the rod, wherein the locking lever is configured to interlink the locking detent over the locking peg by folding the locking lever to extend parallel to the rod.

11. The stop device according to claim 5, further comprising:

a first foot plate secured over a second side surface of the switchable magnet; and a second foot plate secured over a third side surface of the switchable magnet, wherein the third side surface faces away from the second side surface.

12. The stop device according to claim 5, wherein the interface bumper comprises:

an angled top surface to deflect force from an edge of the unit load device toward a surface of the decking; and a corner notch to seat a corner edge of the unit load device.

13. The stop device according to claim 5, further comprising a friction pad over a bottom surface of the switchable magnet.

14. A method for interfering with movement of a unit load device on decking, comprising:

positioning a stop device at a position over the decking; and engaging a switchable magnet of the stop device with the decking, wherein the stop device comprises:

the switchable magnet;

an interface bumper secured over a side surface of the switchable magnet; and a handle rod assembly that extends from the switchable magnet for positioning the switchable magnet on the decking.

15. The method according to claim 14, wherein engaging the switchable magnet to the decking comprises rotating a locking lever of the handle rod assembly and an actuator of the switchable magnet.

16. The method according to claim 15, wherein:

the locking lever comprises a locking detent; and the handle rod assembly further comprises a locking peg on the rod, wherein the locking lever is configured to interlink the locking detent over the locking peg by folding the locking lever to extend parallel to the rod.

17. The method according to claim 15, further comprising releasing the switchable magnet from the decking.

18. The method according to claim 17, wherein releasing the switchable magnet from the decking comprises rotating a locking lever of the handle rod assembly and an actuator of the switchable magnet.

19. The method according to claim 15, wherein the interface bumper comprises an angled surface to deflect force from an edge of the unit load device toward a surface of the decking.

20. The method according to claim 15, wherein the stop device further comprises a friction pad over a bottom surface of the switchable magnet.

* * * * *